United States Patent [19]

Vroegindewey

[11] Patent Number: 5,669,651

[45] Date of Patent: Sep. 23, 1997

[54] SHOVEL WITH LIFT AID ATTACHMENT

[75] Inventor: Adrian Vroegindewey, 4 Woodlawn Ave., Clifton, N.J. 07013

[73] Assignees: Adrian Vroegindewey, Clifton; Dennis A. Vroegindewey, Parsippany, both of N.J.

[21] Appl. No.: 699,417

[22] Filed: Aug. 19, 1996

[51] Int. Cl.⁶ ............................ A01B 1/22; B25G 3/38
[52] U.S. Cl. ...................... 294/58; 294/59; 254/131.5
[58] Field of Search ................. 294/49, 54.5, 57–60; 254/131.5, 132

[56] References Cited

U.S. PATENT DOCUMENTS

| 227,720 | 5/1880 | Baxter | 254/131.5 |
|---|---|---|---|
| 584,827 | 6/1897 | McIndoo | 254/131.5 |
| 738,057 | 9/1903 | O'Connor | 294/59 |
| 2,769,612 | 11/1956 | Weisheit | 254/131.5 |
| 3,035,816 | 5/1962 | Conant | 254/131.5 |
| 3,288,437 | 11/1966 | Pederson | 254/132 |
| 4,881,332 | 11/1989 | Evertsen | 37/285 |
| 5,411,305 | 5/1995 | Revoldt | 294/58 |
| 5,431,468 | 7/1995 | Rosenshine | 294/58 |
| 5,440,828 | 8/1995 | Simpson | 37/285 |

FOREIGN PATENT DOCUMENTS

| 1157495 | 5/1958 | France | 294/59 |
|---|---|---|---|
| 676597 | 6/1939 | Germany | 294/58 |
| 808505 | 7/1949 | Germany | 294/59 |
| 1053224 | 3/1959 | Germany | 294/59 |

*Primary Examiner*—Dean Kramer
*Attorney, Agent, or Firm*—David L. Davis

[57] ABSTRACT

An attachment for a shovel which aids the user in lifting a fully loaded shovel blade without incurring back strain. The attachment is pivotally mounted to the main shovel shaft near the blade and has a cambered portion remote from the shaft. A foot pedal at the distal end of the cambered portion enables the user to apply his body weight so as to rock the attachment along the cambered portion and lift the loaded shovel blade.

22 Claims, 3 Drawing Sheets

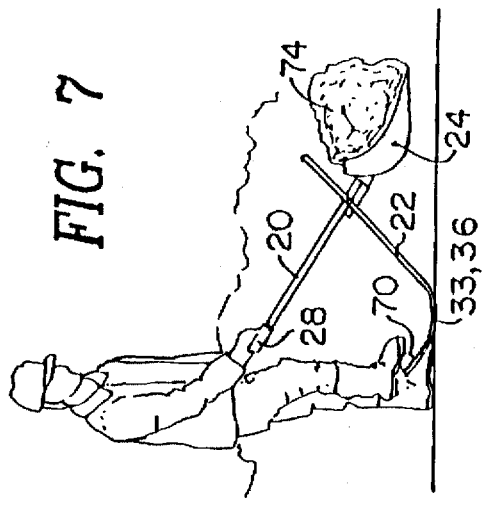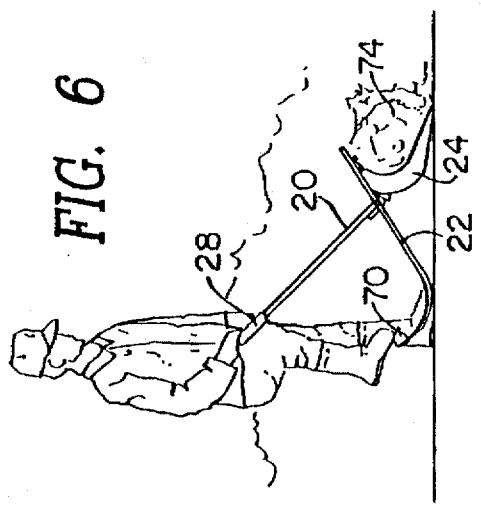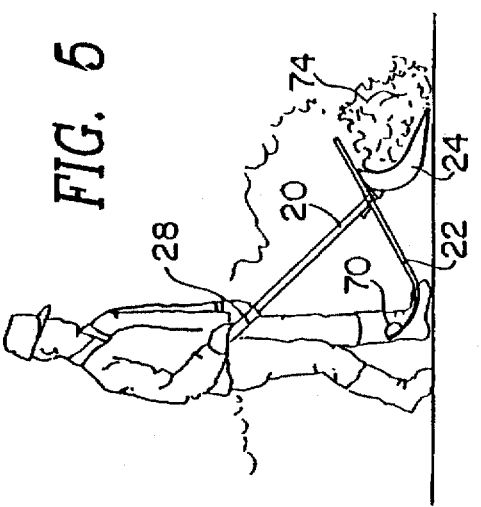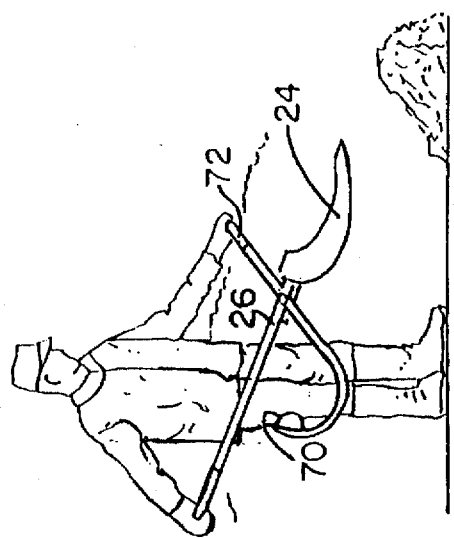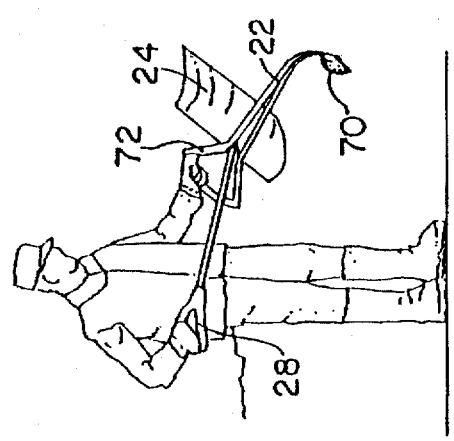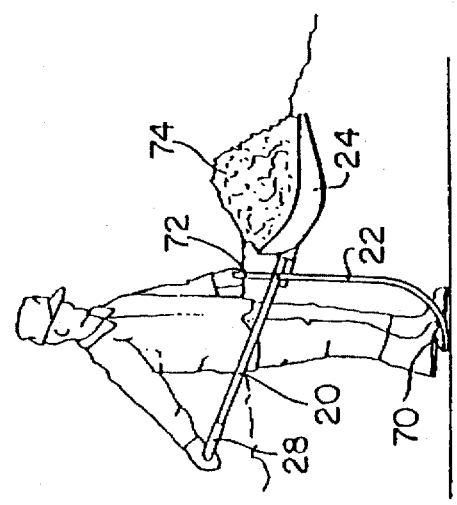

SHOVEL WITH LIFT AID ATTACHMENT

BACKGROUND OF THE INVENTION

This invention relates to shovels and, more particularly, to a shovel attachment which aids in the lifting of a fully loaded shovel without straining the back of a user.

A conventional shovel generally comprises an elongated main shaft interconnecting a hand grip and a material handling head, or blade. During use of such a shovel, the user generally holds the shovel by positioning one hand on the hand grip and the other hand along the shaft near the blade. The shovel is held in this manner throughout the shoveling process, which can be broken down into three distinct motions including scraping (or digging), lifting and throwing. As a consequence of holding the shovel near the blade, the user must repeatedly bend at the waist during the scraping motion and then straighten up during the lifting and throwing motions while bearing the full load of the shovel. Such repeated bending and straightening creates a great deal of stress on the user's back, resulting in back injuries and premature fatigue.

Various arrangements have been proposed to alleviate this problem. However, all known arrangements still require the user to utilize upper body strength for lifting the loaded shovel. Such use of the upper body musculature can still result in back strain. Accordingly, there exists a need for an arrangement to aid a user in lifting a loaded shovel which does not rely upon the user's upper body strength and does not require the user to repeatedly bend down and straighten up.

SUMMARY OF THE INVENTION

According to this invention, there is provided an attachment for a shovel having a blade and an elongated main handle shaft secured at one end to the blade, which attachment aids the user in lifting the loaded shovel blade by applying the user's own body weight through the user's foot, thereby eliminating back strain. The inventive attachment includes an elongated member having a substantially straight portion terminated by a cambered portion. The straight portion of the elongated member is pivotally mounted to the main shaft about a pivot axis orthogonal to the shaft and adjacent the shovel blade. The elongated member is so oriented that when the shovel is in its normal shoveling position, the pivot axis is substantially horizontal and the cambered portion extends downwardly beyond the straight portion and curves back toward the shaft. A foot support is provided at the distal end of the cambered portion. Thus, when the user applies his body weight downwardly to the foot support, the elongated member is rocked along its cambered portion to lift the loaded blade.

In accordance with an aspect of this invention, the attachment further includes an auxiliary handle secured to the straight portion of the elongated member and positioned across the shaft from the foot support. Accordingly, after the loaded blade is lifted, the user can grasp the auxiliary handle to assist in throwing the loaded material from the shovel blade.

In accordance with another aspect of this invention, the elongated member includes a pair of substantially identical tubular members each having a respective straight portion terminated by a respective cambered portion. The pair of tubular members are mounted to opposite sides of the shaft and the foot support is secured to the distal ends of both tubular members.

BRIEF DESCRIPTION OF THE DRAWINGS

The foregoing will be more readily apparent upon reading the following description in conjunction with the drawings in which like elements in different figures thereof are identified by the same reference numeral and wherein:

FIGS. 5–10 illustrate the use of a shovel having the inventive attachment mounted thereon.

DETAILED DESCRIPTION

Figure 1:
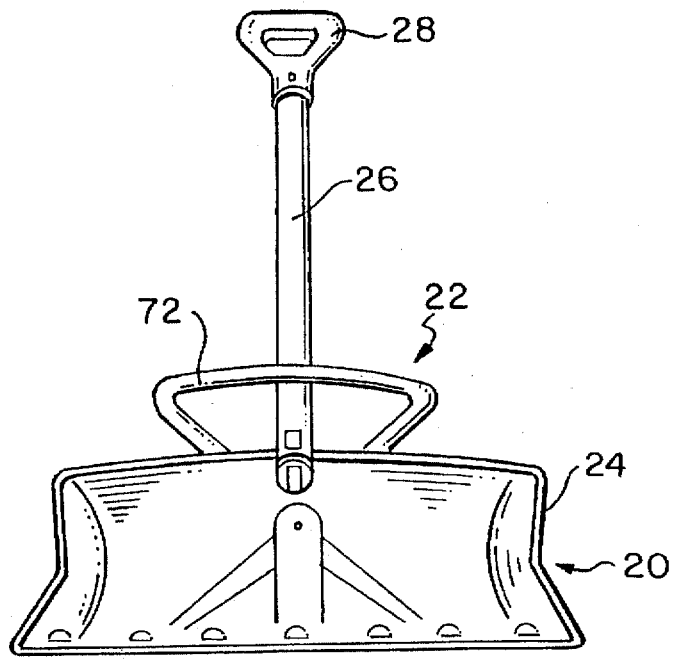
FIG. 1 is a front view of an illustrative snow shovel having an attachment according to the present invention mounted thereon.

Referring now to the drawings, shown therein is a snow shovel, designated generally by the reference numeral 20, having mounted thereon an attachment, designated generally by the reference numeral 22, constructed according to this invention. Although a snow shovel is specifically illustrated herein, it is understood that the inventive attachment 22 can be utilized with other types of material handling tools as well. As shown, the shovel 20 has a material handling head, or blade, 24, an elongated main handle shaft 26 secured at one end to the blade 24, and a hand grip 28 secured to the distal end of the shaft 26. This is conventional construction for the shovel 20, although some shovels may be constructed without the hand grip 28.

Figure 2:
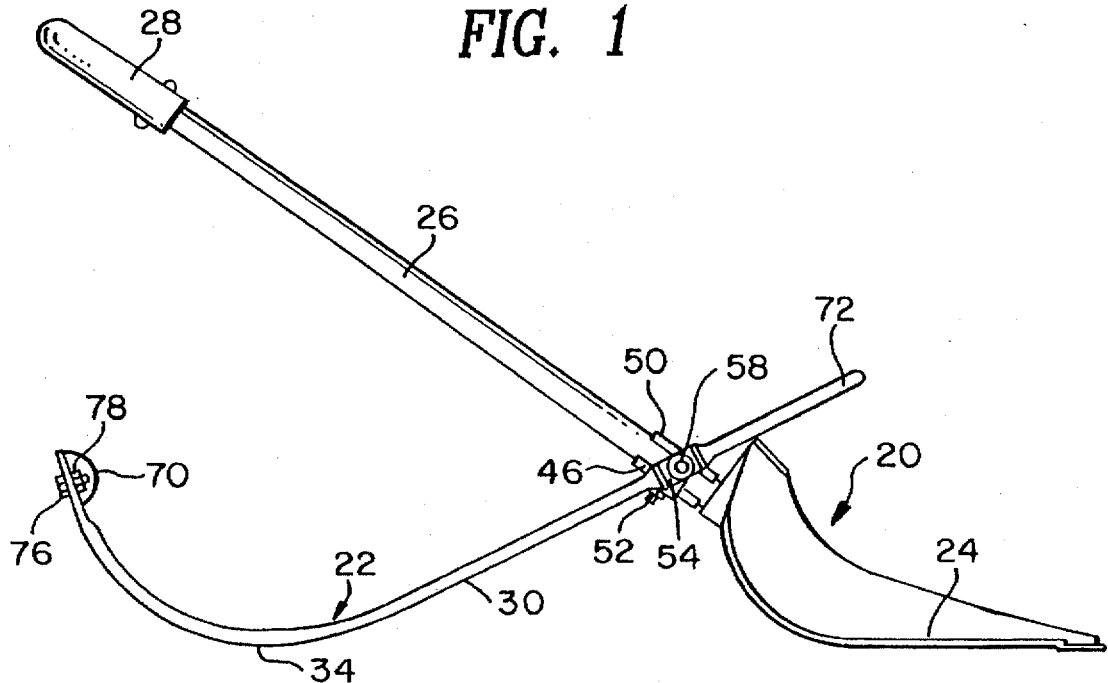
FIG. 2 is a side view of the shovel of FIG. 1.

Preferably, the attachment 22 is formed from a length of tubing which is bent and shaped and flattened where required to receive bolts therethrough. As shown, the attachment 22 is formed as an elongated member having a pair of substantially straight portions 30, 32 each terminated by a respective cambered portion 34, 36. The straight portions 30, 32 are pivotally mounted to the shaft 26 adjacent the blade 24 about a pivot axis orthogonal to the shaft 26. As best shown in FIG. 2, this mounting is such that the straight portions 30, 32 and the cambered portions 34, 36 are so oriented that when the shovel 20 is in its normal shoveling position, the pivot axis is substantially horizontal and the cambered portions 34, 36 extend downwardly beyond the respective straight portions 30, 32 and then curve back toward the shaft 26.

Figure 3:
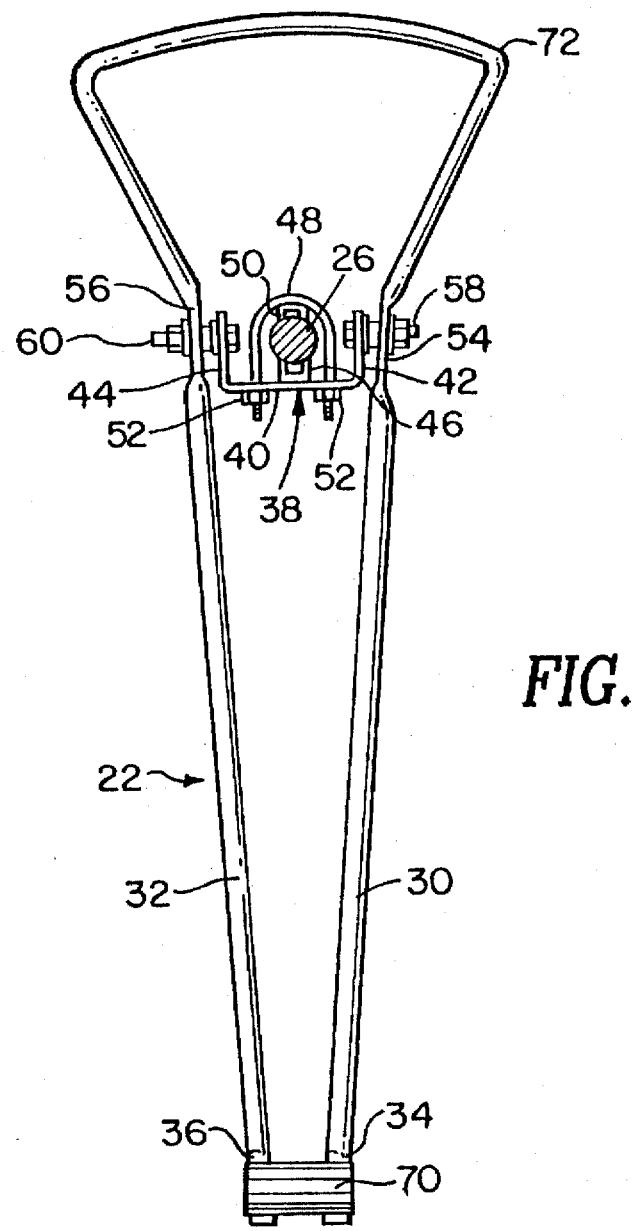
FIG. 3 is an elevational view of an attachment according to the present invention, showing a first illustrative mounting assembly.

FIG. 3 illustrates a first assembly for pivotally mounting the attachment 22 to the shaft 26. As shown, there is provided a bracket 38 having a central portion 40 and a pair of side walls 42, 44 extending generally orthogonally to the central portion 40 and in the same direction, but from opposite ends of the central portion 40. A first seat member 46 is secured to the bracket central portion 40, illustratively by welding. Illustratively, the first seat 46 is an elongated three-sided angle piece with the mid point of its central side welded to the bracket central portion 40 so that the seat 46 extends generally orthogonally to the bracket central portion 40. The mounting arrangement further includes a U-clamp 48 having threaded ends. A second seat 50, similar in construction to the first seat 46, is secured to the center of the U-clamp 48, also illustratively by welding, and also generally orthogonally to the U-clamp 48. Suitably sized and spaced apertures are provided in the bracket central portion 40 so that the threaded ends of the U-clamp 48 can be extended therethrough. Thus, the seats 46, 50 are placed on opposite sides of the shaft 26 with their longitudinal axes parallel to the shaft 26, the ends of the U-clamp are inserted through respective apertures in the bracket central portion 40, and the assembly is secured by nuts 52 threaded onto the ends of the U-clamp 48. The side walls 42, 44 of the bracket 38 are provided with aligned apertures. The ends of the straight portions 30, 32 of the attachment 22 are flattened at 54, 56, respectively, and are also provided with aligned apertures therethrough. To complete the mounting assembly, a threaded bolt 58 is extended through the aperture in the side wall 42 and through the aperture in the flattened portion 54 and secured in place with suitable nuts and washers. Similarly, the bolt 60 is provided to secure the flattened portion 56 to the side wall 44. The axes of the bolts 58, 60 are co-linear and orthogonal to the longitudinal axis of the shaft 26 and define the pivot axis of the attachment 22. Thus, when the mounting assembly is installed on the shaft 26, care must be taken that the resulting pivot axis is substantially horizontal when the shovel 20 is in its normal shoveling position.

Figure 4:
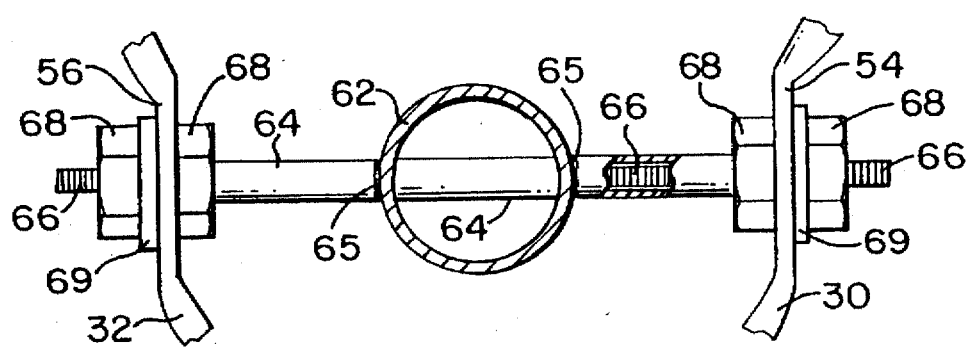
FIG. 4 shows an alternate construction for mounting the inventive attachment to the shovel main shaft.

An alternative mounting assembly is illustrated in FIG. 4, which shows a hollow metal shovel shaft 62, it being understood that this mounting assembly is not limited to that particular form of shaft. In any event, the mounting assembly includes a hollow sleeve 64 with a central longitudinal axis defining the pivot axis of the attachment 22. The sleeve 64 extends through suitable apertures in the shaft 62 with its central longitudinal axis being orthogonal to the longitudinal axis of the shaft 62. The sleeve 64 is secured to the shaft 62, illustratively by welds 65. An elongated threaded member 66 extends through the sleeve 64 and acts as a pivot shaft. Nuts 68 are threaded onto the shaft 66, with the flattened portion 54 of the straight portion 30 therebetween, along with suitable washers 69, the shaft 66 extending through respective apertures in the flattened portions 54, 56. The nuts 68 function to hold the shaft 66 within the sleeve 64 to prevent longitudinal movement of the shaft 66 and allow angular movement of the shaft 66 about the pivot axis within the sleeve 64. Again, when the sleeve 64 is secured to the shaft 62, care must be taken to insure that the longitudinal axis of the sleeve 64 is substantially horizontal when the shovel 20 is in its normal shoveling position.

A foot support, or pedal, 70 is secured to the distal ends of the cambered portions 34, 36. Thus, each of the cambered portions 34, 36 has its distal end flattened and provided with an aperture through that flattened portion. The foot pedal 70 is illustratively a hollow D-shaped tubular piece having its flat side secured to the flattened distal ends of the cambered portions 34, 36. This flat side of the foot pedal 70 is provided with a pair of apertures which align with the apertures at the distal ends of the cambered portions 34, 36. Thus, bolts 76 and nuts 78 can be utilized to secure the foot pedal 70 to the ends of the cambered portions 34, 36. Preferably, the curved side of the foot pedal 70 is textured, either directly or by applying a textured material thereto, so as to provide a non-slip surface.

The attachment 22 is further provided with an auxiliary handle 72 secured to the straight portions 30, 32 and positioned across the shaft 26 from the foot pedal 70. Illustratively, the auxiliary handle 72 is formed unitarily with the straight portions 30, 32 and the cambered portions 34, 36 from a single length of tubing. Alternatively, the straight portions 30, 32 can continue beyond the flattened portions 54, 56 and have a separate auxiliary handle attached thereto. As shown, the tubing is bent outward beyond the flattened portions 54, 56 so that the lateral extent of the auxiliary handle 72 is increased. This assists in discharging the load from the shovel, as will be described hereinafter. Further, the auxiliary handle 72 is preferably formed with a slight curve, as shown, to further assist in such discharge.

Thus, the attachment 22 can be removably mounted to the shovel 20, as shown in FIG. 3, so that when the shovel 20 wears out the attachment 22 can be placed on a new shovel. Alternatively, a more permanent mounting of the attachment 22 to the shovel 20 can be effected, as illustrated in FIG. 4.

FIGS. 5–10 illustrate the use of the shovel 20 and attachment 22. FIG. 5 illustrates granular material 74, such as snow, being scooped onto the shovel blade 24. The attachment 22 trails behind the blade 24. As shown in FIG. 6, after the blade 24 is loaded, the user steps on the foot pedal 70 and depression of the foot pedal 70 starts to raise the shovel blade 24 holding the load 74, as shown in FIG. 7. The rocking of the attachment 22 along the cambered portions 34, 36 allows the blade 24 to be raised without any back strain to the user, by the user applying his body weight through his foot to the foot pedal 70. As shown in FIG. 8, with the foot pedal 70 fully depressed, the loaded blade 24 is fully raised and the auxiliary handle 72 of the attachment 22 is in position to be gripped by the user. By gripping the auxiliary handle 72, as well as the hand grip 28, the user may then throw the load of granular material off the blade 24 to the side. The extended length of the auxiliary handle 72 allows the user to tilt the loaded shovel to discharge the load in a desired direction by gripping the auxiliary handle off-center on the opposite side, thereby making the discharge simpler and easier, with the load 74 coming off the front and side of the blade 24. Alternatively, the user may hold both handles 28, 72 and carry the loaded shovel to some other location. In this case, the auxiliary handle 72 is gripped in the center so the loaded shovel is balanced. It has been found that oftentimes snow will stick to the blade 24. Therefore, the handle 72 may be pulled back sharply, as shown in FIG. 9, causing the straight portions 30, 32 to be knocked against the blade 24 to remove any such snow which sticks. The user then pushes the handle 72 forwardly, bringing the foot pedal 70 back, as shown in FIG. 10. The user lowers the blade 24 and the attachment 22 to repeat the process.

Accordingly, there has been disclosed an improved shovel with a lift aid attachment. It is understood that the above-described embodiments are merely illustrative of the application of the principles of this invention. Numerous other embodiments may be devised by those skilled in the art without departing from the spirit and scope of this invention, as defined by the appended claims.

What is claimed is:

1. An attachment for a shovel having a blade and an elongated main handle shaft secured at one end to the blade, the attachment comprising:

an elongated member having a substantially straight portion terminated by a cambered portion;

mounting means for pivotally mounting said straight portion to said shaft about a pivot axis orthogonal to said shaft and adjacent said blade, with said elongated member being so oriented that when said shovel is in its normal shoveling position the pivot axis is substantially horizontal and the cambered portion extends downwardly beyond the straight portion and curves back toward said shaft;

a foot support at the distal end of said cambered portion; and an auxiliary handle secured to said straight portion and positioned across said shaft from said foot support.

2. The attachment according to claim 1 wherein said mounting means comprises:

a bracket having a central portion and a side wall extending transversely to the central portion from an end of the central portion;

means for clamping said central portion to said shaft with said side wall extending beyond said pivot axis; and means for pivotally securing said straight portion to said side wall at said pivot axis.

3. The attachment according to claim 1 wherein said mounting means comprises:

a hollow sleeve having a central longitudinal axis, said sleeve extending through and secured to said shaft with the central longitudinal axis being co-linear with the pivot axis;

a pivot shaft extending through said sleeve;

means for holding said pivot shaft in said sleeve to prevent longitudinal movement of said pivot shaft and allow angular movement of said pivot shaft about said pivot axis within said sleeve; and means for securing said straight portion to an end of said pivot shaft.

4. The attachment according to claim 1 wherein said foot support comprises a hollow D-shaped tubular piece having its flat side secured to the distal end of said cambered portion on the side of said cambered portion which faces said shaft.

5. The attachment according to claim 4 wherein the curved side of said tubular piece is textured to provide a non-slip surface.

6. An attachment for a shovel having a blade and an elongated main handle shaft secured at one end to the blade, the attachment comprising:

an elongated member including a pair of substantially identical tubular members each having a respective substantially straight portion terminated by a respective cambered portion;

mounting means for pivotally mounting said straight portions of said pair of tubular members to opposite sides of said shaft about a pivot axis orthogonal to said shaft and adjacent said blade, with said tubular members being so oriented that when said shovel is in its normal shoveling position the pivot axis is substantially horizontal and the cambered portions extend downwardly beyond the straight portions and curve back toward said shaft; and a foot support secured to the distal ends of said cambered portions of both said tubular members.

7. The attachment according to claim 6 further comprising:

an auxiliary handle secured to the straight portion of both said tubular members and positioned across said shaft from said foot support.

8. The attachment according to claim 7 wherein said auxiliary handle has a lateral extent sufficient to allow a user to grip said auxiliary handle off-center so that the shovel blade when loaded tilts to the side opposite where said auxiliary handle is gripped.

9. The attachment according to claim 7 wherein said pair of tubular members and said auxiliary handle are all formed unitarily from a single length of tubing.

10. The attachment according to claim 6 wherein said mounting means comprises:

a bracket having a central portion and a pair of parallel side walls extending transversely to the central portion and in the same direction from opposite ends of the central portion;

means for clamping said central portion to said shaft with said side walls flanking said shaft and extending beyond said pivot axis; and means for pivotally securing each of said straight portions to a respective one of said side walls at said pivot axis.

11. The attachment according to claim 6 wherein said mounting means comprises:

a hollow sleeve having a central longitudinal axis, said sleeve extending through and secured to said shaft with the central longitudinal axis being co-linear with the pivot axis;

a pivot shaft extending through said sleeve;

means for holding said pivot shaft in said sleeve to prevent longitudinal movement of said pivot shaft and allow angular movement of said pivot shaft about said pivot axis within said sleeve; and means for securing each of said straight portions to a respective end of said pivot shaft.

12. A shovel comprising:

a material handling head;

an elongated main handle shaft secured at one end to the material handling head;

an elongated member having a substantially straight portion terminated by a cambered portion;

mounting means for pivotally mounting said straight portion to said shaft about a pivot axis orthogonal to said shaft and adjacent said material handling head, with said member being so oriented that when said shovel is in its normal shoveling position the pivot axis is substantially horizontal and the cambered portion extends downwardly beyond the straight portion and curves back toward said shaft;

a foot support at the distal end of said cambered portion; and an auxiliary handle secured to said straight portion and positioned across said shaft from said foot support.

13. The shovel according to claim 12 wherein said mounting means comprises:

a bracket having a central portion and a side wall extending transversely to the central portion from an end of the central portion;

means for clamping said central portion to said shaft with said side wall extending beyond said pivot axis; and means for pivotally securing said straight portion to said side wall at said pivot axis.

14. The shovel according to claim 12 wherein said mounting means comprises:

a hollow sleeve having a central longitudinal axis, said sleeve extending through and secured to said shaft with the central longitudinal axis being co-linear with the pivot axis;

a pivot shaft extending through said sleeve;

means for holding said pivot shaft in said sleeve to prevent longitudinal movement of said pivot shaft and allow angular movement of said pivot shaft about said pivot axis within said sleeve; and means for securing said straight portion to an end of said pivot shaft.

15. The shovel according to claim 12 wherein said foot support comprises a hollow D-shaped tubular piece having its flat side secured to the distal end of said cambered portion on the side of said cambered portion which faces said shaft.

16. The shovel according to claim 15 wherein the curved side of said tubular piece is textured to provide a non-slip surface.

17. A shovel comprising:

a material handling head;

an elongated main handle shaft secured at one end to the material handling head;

an elongated member including a pair of substantially identical tubular members each having a respective substantially straight portion terminated by a respective cambered portion;

mounting means for pivotally mounting said straight portions of said pair of tubular members to opposite sides of said shaft about a pivot axis orthogonal to said shaft and adjacent said material handling head, with said tubular members being so oriented that when said shovel is in its normal shoveling position the pivot axis is substantially horizontal and the cambered portions extend downwardly beyond the straight portions and curve back toward said shaft; and a foot support secured to the distal ends of said cambered portions of both said tubular members.

18. The shovel according to claim 17 further comprising:

an auxiliary handle secured to the straight portion of both said tubular members and positioned across said shaft from said foot support.

19. The shovel according to claim 18 wherein said auxiliary handle has a lateral extent sufficient to allow a user to grip said auxiliary handle off-center so that the shovel head when loaded tilts to the side opposite where said auxiliary handle is gripped.

20. The shovel according to claim 18 wherein said pair of tubular members and said auxiliary handle are all formed unitarily from a single length of tubing.

21. The shovel according to claim 17 wherein said mounting means comprises:

a bracket having a central portion and a pair of parallel side walls extending transversely to the central portion and in the same direction from opposite ends of the central portion;

means for clamping said central portion to said shaft with said side walls flanking said shaft and extending beyond said pivot axis; and means for pivotally securing each of said straight portions to a respective one of said side walls at said pivot axis.

22. The shovel according to claim 17 wherein said mounting means comprises:

a hollow sleeve having a central longitudinal axis, said sleeve extending through and secured to said shaft with the central longitudinal axis being co-linear with the pivot axis;

a pivot shaft extending through said sleeve;

means for holding said pivot shaft in said sleeve to prevent longitudinal movement of said pivot shaft and allow angular movement of said pivot shaft about said pivot axis within said sleeve; and means for securing each of said straight portions to a respective end of said pivot shaft.

* * * * *